United States Patent Office 2,739,290
Patented Mar. 20, 1956

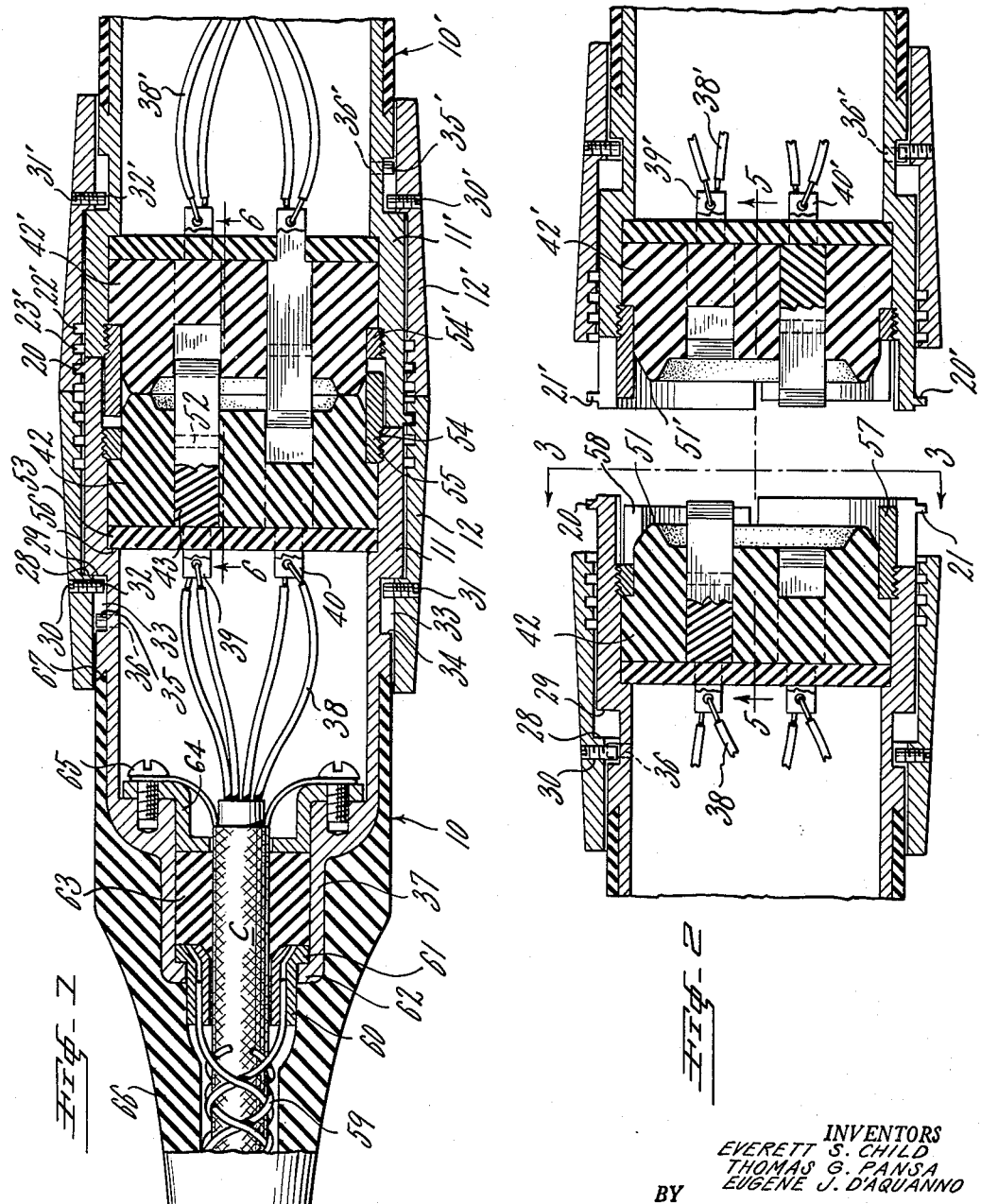

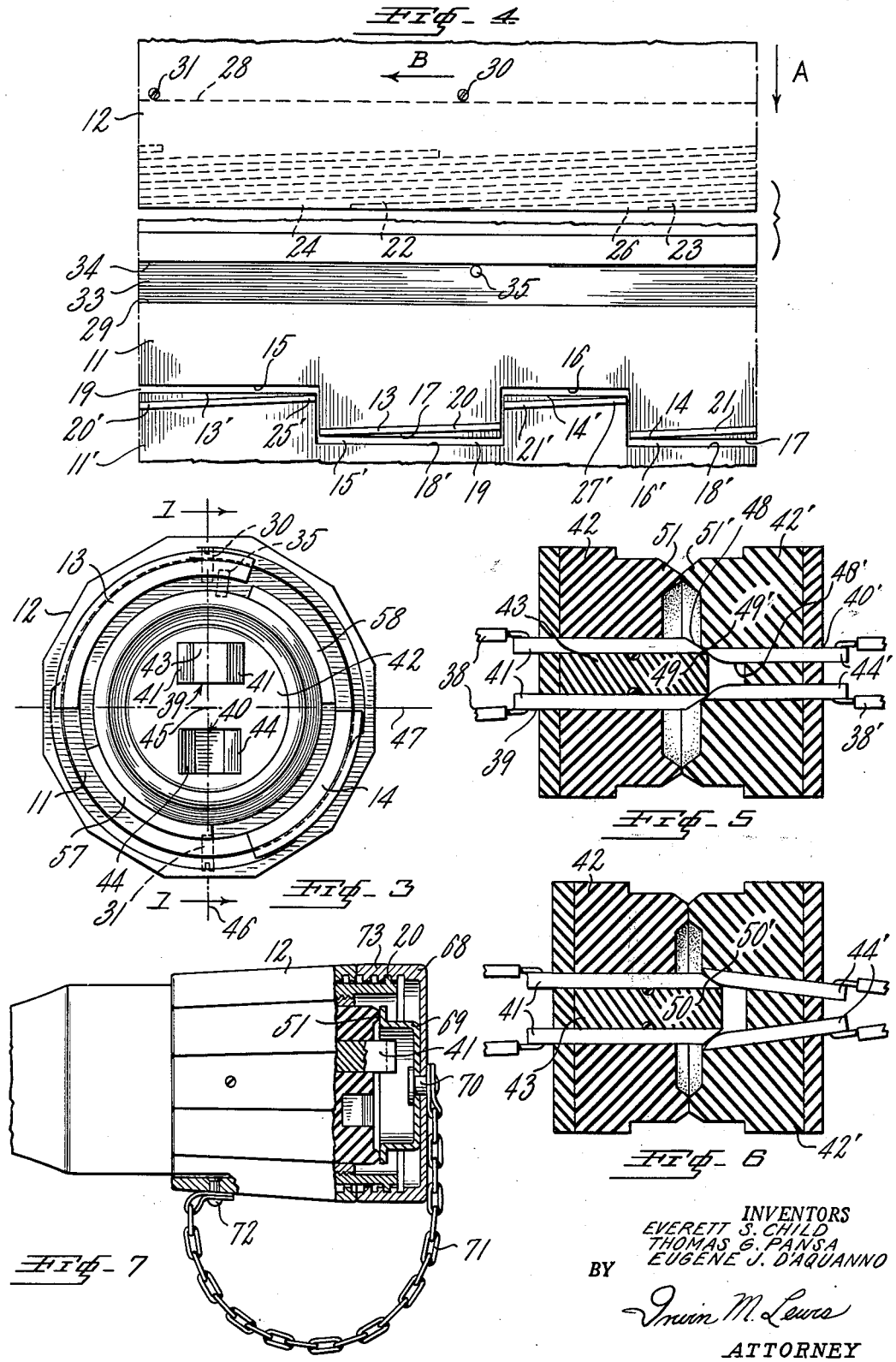

2,739,290

ELECTRICAL CABLE COUPLING

Everett S. Child, Barrington, Thomas G. Pansa, Bristol, and Eugene J. D'Aquanno, North Smithfield, R. I., assignors to United States Rubber Company, New York, N. Y., a corporation of New Jersey Application June 20, 1951, Serial No. 232,632

5 Claims. (Cl. 339—49)

This invention relates to detachable couplings for electric cables. In particular, the invention relates to a coupling for electric cables in which the individual coupling members are identical so that any two coupling members may be coupled together and in which the individual coupling members are provided with identical force multiplying mechanisms which may be easily operated to couple and uncouple the individual coupling members.

The advantage of having the individual coupling members of an electrical cable coupling identical has been recognized by the prior art and couplings have been made incorporating this feature. Such a coupling is shown in U. S. Patent No. 2,396,872. Such identical couplings however are not provided with force multiplying mechanisms to draw the coupling members together and since direct manual force can only be used in operating this type of coupling, the electrical terminals and seals around them cannot be tightly pressed together to form good contact and seal. It is extremely important in communication cables to maintain good contact between the terminals and to provide a tight moisture proof seal around them to prevent fluctuations in current and voltage and for this reason couplings not having force multiplying mechanism are often not satisfactory for such use.

Electric cable couplings incorporating force multiplying mechanisms are also well known in the prior art. Such a coupling is shown in U. S. Patent No. 2,337,618 in which a threaded nut or ring on one coupling member engages threads on the other coupling member. Such a force multiplying mechanism is very effective in drawing the coupling members together to bring the terminals into tight engagement and for effectively compressing the sealing means to prevent entry of moisture. The coupling members of such couplings however, are not identical, and therefore care must be taken in selecting the proper mating coupling members.

It is one object therefore, of the present invention to provide a coupling for electric cables which incorporates the advantages of the force multiplying mechanism in a coupling having identical coupling members.

It is another object of the invention to provide means for quickly coupling and uncoupling the coupling members.

A further object is to provide a terminal construction which may be forced into tight engagement by the force multiplying mechanism and in which the point of contact between the terminals shifts as the coupling members are pulled together so that the point of contact of the terminals in fully coupled position will be spaced from the initial point of contact which may be burnt due to arcing.

A still further object of this invention is to provide a water tight seal around the conductor terminals when the coupling members are drawn together.

Other objects and advantages of the present invention will become apparent from the following description when read in conjunction with the accompanying drawing, wherein:

Fig. 1 is a longitudinal sectional view, taken on line 1—1 of Fig. 3 looking in the direction of the arrows and along the axis of a coupling embodying the present invention, in which the coupling members are coupled together;

Fig. 2 is a similar view showing the coupling members in a separated or uncoupled relationship;

Fig. 3 is an end view looking in the direction of the arrows of the line 3—3 of Fig. 2;

Fig. 4 is an axially exploded exterior view of developments of cooperating parts of the inner coupling sleeve and the outer coupling sleeve of one coupling member and a part of the inner coupling sleeve of the other coupling member on a reduced scale;

Fig. 5 is an enlarged sectional view showing the position of the male and female terminals taken on line 5—5 of Fig. 2 after being brought together in position of initial contact;

Fig. 6 is an enlarged sectional view on line 6—6 of Fig. 1 showing the position of the terminals when fully coupled, and Fig. 7 is a partial sectional view showing a cap as applied to one of the coupling members.

Referring to the drawings and in particular to Figs. 1 and 2 of the drawing, the invention relates to a pair of coupling members 10 and 10', to each of which is secured an end of a cable C to be connected to the end of another cable. The coupling members 10 and 10' are identical, and the description therefore will in the most part be limited to coupling member 10. In the drawings, the same reference numbers are used to identify the same parts of coupling member 10 and coupling member 10', with the exception that parts of coupling member 10' are further identified by the use of a prime mark. In Fig. 1, the coupling members are shown in coupled relationship, in which the member 10' is rotated 180° with respect to member 10.

As shown in Figs. 1 and 2, the coupling member 10 comprises an inner sleeve 11 and an outer sleeve 12 rotatively mounted thereon for forcibly drawing the end of the inner sleeve 11' of the member 10' towards the end of the inner sleeve 11, and locking the coupling members together. The ends of the cables C to be connected extend into the inner sleeves 11, 11' and the conductor terminals within the sleeves also are forcibly drawn together by the coupling. For the foregoing purpose, as particularly shown by the developed views of the parts in Fig. 4, the inner sleeve 11 has end projections 13 and 14, which are adapted to slidably fit into recesses 15' and 16' formed between corresponding end projections 13' and 14' on the opposite inner sleeve 11'. As will be noted the length of the arc of the projection 13 is greater than the length of the arc of the projection 14 so that the sleeves 11, 11' can be put together in only the position they occupy when rotated 180° in respect to each other. In order to more clearly illustrate the construction, the end surfaces 17 of the projections 13 and 14 are shown slightly separated from the bottoms 18' of the recesses 15' and 16' by a space 19. The projections 13 and 14 on the inner sleeve 11, and the projections 13' and 14' on the inner sleeve 11' are respectively provided with external helical lips, or threads 20 and 21 and 20' and 21'. The outer sleeve 12 is provided with internal double threads 22 and 23, either of which is adapted to engage either of the threads 20' or 21' when the outer sleeve 12 is pushed axially (as indicated by the arrow A) towards the inner sleeve 11' on the opposite coupling member and turned in the direction of the arrow B. Assuming that the parts are in the relative angular positions as shown in Fig. 4, if the outer sleeve 12 were pushed in a straight axial line, the beginning 24 of the thread 22 would be in position to engage the beginning 25' of the thread 20', and the beginning 26 of the thread 23 would be in position to engage the beginning 27' of the thread 21'. As the outer sleeve 12 is turned in the direction of the arrow B onto the threads 20' and 21', an internal shoulder 28 (Figs. 2 and 4) on the outer sleeve 12 will engage a shoulder 29 on the inner sleeve 11 and draw the ends of the inner sleeves 11, 11' from the position shown in Fig. 4 to the position in Fig. 1, so that the end surfaces 17 of the projections will be in tight contact with the bottom surfaces 18' of the recesses. The coupling is thereby provided with great rigidity. It is to be understood that the outer sleeve 12' is operated, in a manner similar to that of outer sleeve 12, so that its internal double threads 22' and 23' (Fig. 1) are similarly turned down onto the threads 20 and 21 on the inner sleeve 11 to further strengthen and increase the rigidity of the coupling.

As shown in Figs. 1 and 2, the outer sleeve 12 is retained on the inner sleeve 11 by pins 30 and 31 which are secured in the outer sleeve 12 at points 180° apart. Each of the pins 30, 31 has an end 32 which extends into a peripheral groove 33 in the inner sleeve 11, which is formed between the shoulder 29 and a shoulder 34. The width of the groove 33 is greater than the diameter of the ends 32 of the pins, so that the sleeve 12 may move axially on the inner sleeve 11 to the extent permitted by the engagement of the shoulder 28 on the outer sleeve 12 with the shoulder 29 on the inner sleeve 11 and by the engagement of the ends 32 of the pins with the shoulder 34 on the inner sleeve 11.

To disengage the coupling members 10, 10' when coupled together as shown in Fig. 1, the operator grasps the outer sleeves 12, 12', one with each of his hands and turns them in opposite directions. The torque applied to one outer sleeve opposes the torque applied to the other sleeve and the coupling as a unit will not rotate until one of the outer sleeves has been unscrewed from the opposite inner sleeve. Assuming that the outer sleeve 12 became unscrewed before the outer sleeve 12', in order to prevent the coupling from rotating as a unit and permit the other sleeve 12' to be unscrewed by continuing the application of the torque to the outer sleeves, the relative rotation between the outer sleeve 12 and the inner sleeve 11 is arrested immediately after the outer sleeve is unscrewed from the opposite inner sleeve. The rotation of the unscrewed sleeve 12 is arrested by the engagement of one of the ends 32 of the pin 30 or 31 with the projecting end 35 of a pin 36 secured in the bottom of the groove 33 of the inner sleeve 11. Assuming that the outer sleeve 12' became unscrewed before the sleeve 12, then the end 32' of one of the pins 30' or 31' would likewise engage the end 35' of the pin 36' in the sleeve 11', and arrest the relative rotation between the outer sleeve 12' and the inner sleeve 11', so as to provide the opposing torque force required to unscrew the outer sleeve 12.

Referring now to the electrical circuit, and particularly to the coupling member 10 in Fig. 1, an end of the cable C extends into a reduced section 37 of the inner sleeve 11, and as shown it has four individual conductors 38. The conductors are connected in groups of two to a male terminal 39 and to a female terminal 40. As shown in Figs. 3 and 5, the male terminal 39 comprises a pair of metal plates 41, to which the conductors 38 are connected. The plates 41 are secured in a resilient insulating block 42, such as soft resilient rubber, and are separated by a hard insulating block 43 which may be made of a suitable insulating material, such as "Bakelite." The female terminal 40 comprises a pair of parallel contact plates 44, which are also anchored in the insulating block 42. The plates 44 are insulated and separated from each other by the soft resilient rubber of the block 42. The plates in each terminal are parallel to each other and are also parallel to the plates of the other terminal. As shown in Fig. 3, the male and female terminals 39 and 40 are arranged an equal distance from the center 45 of the inner sleeve 11 on a common diameter 46, which is parallel to and equi-distant from the contact plates 41 and 44 of the terminals 39 and 40. The common diameter 46 is also perpendicular to the diameter 47 of the inner sleeve 11 passing through one end of each arc of the projections 13 and 14 of the inner sleeve 11. In other words the male and female terminals are centrally located in respect to the inner sleeve 11 on a common diameter which is perpendicular to a common diameter coinciding with an end of each are of the projections 13 and 14.

As shown in Figs. 5 and 6, the ends 48 of the contact plates 41 of the male terminal 39 are beveled on the outside, and the ends 48' of the contact plates 44' of the female terminal 40' are beveled on the inside. While it is preferred to have the ends of the contact plates shaped as shown, each of the contacting ends of the male and female plates may be provided with a straight bevel as shown on the plates 41, or a slightly rounded bevel as shown on the plates 44'. The purpose of beveling the plates is so that upon initial contact as shown in Fig. 5, the tips 49, 49' of the plates will initially make contact, as shown in Fig. 5 when the coupling members 10, 10' are brought together in the position shown in Fig. 4 with the space 19 between the ends of the sleeves 11, 11'. When the ends of the inner sleeves 11, 11' are drawn together by the outer sleeves 12, 12' so as to close the space 19 and draw the coupling members 10, 10' together in the position shown in Fig. 1, the male and female contact plates will be drawn from the position shown in Fig. 5 to the position shown in Fig. 6. In passing from the initial to the final position of contact, the initial points of contact between the contact plates 41, 44' are changed and new surfaces 50, 50' are brought into contact with each other in the final position of the terminals. The initially contacting surfaces sometimes become oxidized due to the arcing action of the current, and such oxidized surfaces change the resistance of the circuit. In communication cables, any change in resistance is undesirable, and therefore it is advantageous to present the new or bright, unoxidized surfaces of contact in the final position of the contact blades.

The soft rubber insulator blocks 42, 42' are provided with compressible sealing rings 51, 51', which are adapted to encompass the ends of the terminals 41, 41' and 44, 44'. When the coupling members 10, 10' are being coupled together as hereinbefore explained, the initially contacting peripheries of the rings 51, 51' are drawn from their position in Fig. 5 to their position shown in Fig. 6. The peripheries of the ring are deformed by the axial pressure and form a water tight seal around the terminals.

The resilient insulator block 42 is molded about the contact blades 41 and 44 and the separating block 43 while they are held in parallel relationship to each other as indicated in Fig. 5. The block 42 which is made of resilient soft rubber is bonded to the contact blades. The rubber flows into grooves 52 (Figs. 1 and 2) formed in the faces of the hard separating block 43 adjacent the contact blades 41 and serves as a means for further anchoring the separator block 43 to the rubber and to provide more bonding surface between the blades and the block 42. The insulator block 42 rests on a rigid disc-like supporting plate 53, which is made of an insulating material, such as hard rubber or plastic and which may be bonded to the insulator block to form an integral unit. The lower ends of the contact blades extend through the rigid disc-like plate 53, and the separating hard block 43 rests on top of the plate.

The assembled insulating block 42 is secured in the inner sleeve 11 by a guide ring 54, which is provided with external threads that are screwed into internal threads 55 in the sleeve 11 and forces the rigid plate 53 of the block 42 against a shoulder 56 on the inner sleeve 11. Guide projections 57 and 58 extend outwardly from the guide ring 54, and are positioned opposite the recesses 15 and 16, respectively, in the inner sleeve 11 for the purpose of guiding the opposite projections on the other sleeve 11' into the recesses 15 and 16. The guide projections 57 and 58 are also used to form an abutment for the wrench to turn the guide ring 54 into and out of the sleeve 11.

In the assembly of the cable C in the inner sleeve 11, it will be understood that the conductors 38 projecting from the cable will be made sufficiently long so that they can be soldered or otherwise connected to the contact plates of the terminals 39 and 40 before the insulator block 42 is assembled in the sleeve 11. The end of the cable C is secured in the reduced end 37 of the sleeve 11 by a suitable cable grip. One type that may be used is that shown in the drawing which is commonly known as a "Kellems" grip, and comprises a wire mesh cage 59 which surrounds the cable C and has one end anchored in a metal bushing 60. An external flange 61 on the bushing engages an internal flange 62 on the end of the reduced section 37. The cage 59 grips the outside of the cable C, and is prevented from being pulled outwardly of the sleeve 11 by the bushing 60. Packing 63 surrounds the cable C and is compressed against the flange 61 on the bushing 60 by a clamping ring 64, which is clamped against the sleeve 11 and urged into the reduced section 37 thereof by clamping screws 65. The packing prevents the entry of moisture into the reduced end of the sleeve, and also holds the bushing 60 in place. A heavy rubber-like covering 66 surrounds the end of the cable and extends over the reduced section 37 of the sleeve 11 for the purpose of forming a waterproof joint between the cable and the inner sleeve, and also to provide mechanical protection for the end of the cable. The rubber-like covering 66 which is bonded to section 37 of the sleeve 11, terminates in an undercut groove 67 in the outer periphery of the sleeve 11 so that the end of the rubber-like sleeve will not be pulled away from the inner metal sleeve 11.

Referring to Fig. 7, a cap 68 can be threaded onto the lips 20, 21 of the sleeve 11 when the coupling members 10 and 10' are uncoupled. The cap 68 has a cup shaped member 69 fastened to the inside thereof by a rivet 70. When the cap 68 is screwed onto the sleeve 11, the member 69 presses on the sealing ring 51 and thereby provides a water tight seal for the terminals 39 and 40. A chain 71 is secured to the cap 68 by the rivet 70 and is attached to the outer sleeve 12 by a rivet 72 which prevents loss of the cap. The cap 68 is provided with a skirt 73, which makes contact with the end of the outer sleeve 12 and thereby excludes dirt from the inside of coupling member.

The above described structure provides an efficient, water tight coupling for electric cables. Because the indivdual coupling members are identical, there is no problem as to selection of male and female couplings, as any two coupling members may be coupled together. As the projecting members and recesses are of different arc lengths, the coupling members will go together in only one relative position, therefore, it is impossible to couple them together in the wrong manner. The threaded sleeves 11, 11' and 12, 12' draw the coupling members tightly together to compress the compressible sealing rings 51, 51' together to form a water tight seal around the terminals. The ends of the projections on the inner sleeves being drawn tightly against the bottoms of the recesses in the inner sleeves, a rigid coupling is formed which maintains uniform pressure between contact plates, and thereby prevents current and voltage fluctuations. This is very important in communication cables. The novel construction of the terminals insures good contact between them, when they are forced tightly together. The stop pin 36 in the circumferential groove 33 facilitates coupling and uncoupling of the coupling members.

It is to be understood that the above description and accompanying drawing is for the purpose of illustration only and not by the way of limitation and that changes and modifications can be made therein without departing from the spirit and scope of the invention.

Having thus described our invention, what we claim and desire to protect by Letters Patent is:

1. A coupling member for multi-conductor cables adapted to be connected to an identical coupling member of another multi-conductor cable, said coupling member comprising an inner sleeve secured at one end to the end of said cable, the opposite free end of said sleeve having an insulator block secured therein, conductor terminals secured in said block and connected to conductors of said cable, said sleeve having alternate projections and recesses on its free end adapted respectively to be received by and to receive like alternate recesses and projections of the other identical coupling member, an outer internally threaded sleeve rotatably keyed to said inner sleeve, a helical lip on each of said projections, said internal threads and said helical lips being adapted respectively to engage and be engaged by a helical lip on the projections and internal threads in the outer sleeve of the other identical coupling member, whereby rotation of the outer sleeves will draw the two members together and force the conductor terminals in one member into contact with the conductor terminals of the other member, said outer sleeve being freely slideable axially toward and away from said free end of said inner sleeve for engagement and disengagement with the helical lip on each of said projections of said other identical coupling member, and cooperating stop means carried by said inner and outer sleeves for preventing rotation of said outer sleeve when said outer sleeve is disengaged from the helical lip on each of said projections of said other identical member and moved axially away from said free end of the inner sleeve.

2. A coupling member for multi-conductor cables adapted to be connected to an identical coupling member of another multi-conductor cable, said coupling member comprising an inner sleeve secured at one end to the end of said cable, the opposite free end of said sleeve having an insulator block secured therein, conductor terminals secured in said block and connected to conductors of said cable, a compressible sealing ring extending from the face of said block and surrounding said terminals, said sleeve having alternate projections and recesses on its free end adapted respectively to be received by and to receive like alternate recesses and projections of the other identical coupling member, an outer internally threaded sleeve rotatably secured to said inner sleeve, a helical lip on each of said projections, said internal threads and said helical lips being adapted to respectively engage and be engaged by a helical lip on the projections and internal threads in the outer sleeve of the other identical coupling member, whereby rotation of the outer sleeves will draw the two members together and force said conductor terminals in one member into contact with the conductor terminals of the other member, said outer sleeve being freely slideable axially toward and away from said free end of said inner sleeve for engagement and disengagement with the helical lip on each of said projections of said other identical coupling member, and cooperating stop means carried by said inner and outer sleeves for preventing rotation of said outer sleeve when said outer sleeve is disengaged from the helical lip on each of said projections of said other identical member and moved axially away from said free end of the inner sleeve.

3. A coupling member for multi-conductor cables adapted to be connected to an identical coupling member of another multi-conductor cable, comprising a sleeve secured at one end to the end of said cable, the opposite free end of said sleeve having an insulator block secured therein, a male and female terminal secured in said block, said male and female terminals being spaced apart on a common diameter of said block and connected to conductors of said cable, said sleeve having a pair of alternate projections and recesses on its free end adapted respectively to be received by and to receive a like pair of alternate recesses and projections on the other identical coupling member, one projection of said pair of projections having a greater arc length than the other projection, and one end of each arc of said projections lying on a common diameter which is perpendicular to said common diameter of said terminals.

4. A coupling member for multi-conductor cables adapted to be connected to an identical coupling member of another multi-conductor cable, comprising an inner sleeve having one end secured to the cable end, an insulator block secured in the other end of said sleeve, a male and a female pair of conductor terminals secured in said block and connected to said conductors, the free end of said sleeve having a pair of oppositely disposed projections of unequal arc lengths and a pair of oppositely disposed recesses of unequal arc lengths adapted to be received by and to receive identical recesses and projections in the other coupling member, a helical lip on said projections, an outer sleeve rotatively secured to said inner sleeve, said outer sleeve having internal threads adapted to engage the lips on the projections of the other coupling member to draw said members together, said male and female terminals being arranged on a common diameter, and the ends of the arcs of said projections towards which said lips are outwardly inclined being on a common diameter perpendicular to said common diameter of said terminals.

5. A coupling member for multi-conductor cables adapted to be connected to an identical coupling member of another multi-conductor cable, comprising an inner sleeve having one end secured to the cable end, an insulator block secured in the other end of said sleeve, conductor terminals secured in said block and connected to said conductors, a compressible sealing ring extending from the face of said block and surrounding said terminals, the free end of said sleeve having a pair of oppositely disposed projections and recesses adapted to be received by and to receive identical recesses and projections in the other coupling member, a helical lip on said projections, an outer sleeve rotatably secured to said inner sleeve, said outer sleeve having internal threads adapted to engage the lips on the projections of the other coupling member to draw said members together and forcibly press said conductor terminals and sealing ring of one coupling member against the like elements of the other coupling member, said outer sleeve being of a length that one end thereof will contact the opposed end of the outer sleeve of said other identical coupling member when said identical coupling members are coupled together, said outer sleeve being freely slideable axially toward and away from said free end of said inner sleeve for engagement and disengagement with the helical lip on each of said projections of said other identical coupling member.

References Cited in the file of this patent

UNITED STATES PATENTS

| 273,305 | Plankinton | Mar. 6, 1883 |
| 904,522 | Firmin | Nov. 24, 1908 |
| 2,101,345 | Riley | Dec. 7, 1937 |
| 2,125,816 | Reynolds | Aug. 2, 1938 |
| 2,521,822 | Boswell | Sept. 12, 1950 |
| 2,572,448 | Child | Oct. 23, 1951 |

FOREIGN PATENTS

| 693,052 | Germany | July 1, 1940 |